United States Patent
Järvenpää

[11] Patent Number: 5,858,042
[45] Date of Patent: Jan. 12, 1999

[54] METHOD AND APPARATUS FOR IMPROVING THE SEPARATION EFFICIENCY OF A CYCLONE SEPARATOR INTENDED FOR GASEOUS FLUID FLOWS

[75] Inventor: Viljo Järvenpää, Kerava, Finland

[73] Assignee: Wiser Oy, Kerava, Finland

[21] Appl. No.: 652,494

[22] PCT Filed: Oct. 25, 1994

[86] PCT No.: PCT/FI94/00482

§ 371 Date: Jul. 10, 1996

§ 102(e) Date: Jul. 10, 1996

[87] PCT Pub. No.: WO95/14535

PCT Pub. Date: Jun. 1, 1995

[30] Foreign Application Priority Data

Nov. 29, 1993 [FI] Finland ................................ 935295

[51] Int. Cl.⁶ .......................... B01D 45/12; B04C 5/18
[52] U.S. Cl. .................. 55/431; 55/459.1; 209/715; 209/719
[58] Field of Search .................. 55/430, 431, 459.1; 209/143, 710, 711, 715, 719

[56] References Cited

U.S. PATENT DOCUMENTS

| | | | |
|---|---|---|---|
| 836,922 | 11/1906 | Christoph | 209/715 X |
| 3,370,407 | 2/1968 | Morawski | 55/431 X |
| 3,860,401 | 1/1975 | Clark et al. | 55/431 X |

FOREIGN PATENT DOCUMENTS

| | | |
|---|---|---|
| 80699 | 4/1963 | France . |
| 57996 | 7/1891 | Germany . |

OTHER PUBLICATIONS

Derwent's Abstract No. 49562 E/24, Abstract of Soviet Union No. 856–568, A.I. Leytuk, Aug. 25, 1981.
Derwent's Abstract No. 94–198922/24, Abstract of Soviet Union 1807886, UFA Petrochem WKS, Apr. 7, 1993.

Primary Examiner—Tuan N. Nguyen
Attorney, Agent, or Firm—Steinberg & Raskin, P.C.

[57] ABSTRACT

A method and apparatus for improving the separation efficiency of a cyclone separator intended for gaseous medium flows in which an incoming gaseous medium flow to be cleansed is directed into the cyclone separator through an inlet duct such that the incoming medium flow ends up in a downward, revolving flow movement inside the cyclone separator until the incoming medium flow reaches a bottom end of a conical lower part of the cyclone separator, and then becomes a revolving tornado flow that flows in a generally upward direction opposite to the direction of the downward, revolving flow movement. An outlet flow of cleansed gaseous medium is directed through a center pipe situated in the cyclone separator. A component-flow pipe is arranged in the center pipe such that the component-flow pipe has an inlet opening in a wall of the center pipe. A component flow of the incoming medium flow is passed from a location within the cyclone separator through the inlet opening in the wall of the center pipe into the component-flow pipe directed out of the component-flow pipe against the tornado flow such that the component flow disintegrates the tornado flow and thereby prevents solid matter from being carried along with the tornado flow through the center pipe into the outlet flow of the cleansed medium flow.

17 Claims, 1 Drawing Sheet

METHOD AND APPARATUS FOR IMPROVING THE SEPARATION EFFICIENCY OF A CYCLONE SEPARATOR INTENDED FOR GASEOUS FLUID FLOWS

FIELD OF THE INVENTION

The invention concerns a method for improving the separation efficiency of a cyclone separator intended for gaseous medium flows, in which cyclone separator the gaseous medium flow to be cleansed flows into the cyclone separator through an inlet duct and ends up in a revolving flow movement inside the cyclone separator, which movement is changed, in the bottom end of the conical lower part of the cyclone separator, into a revolving tornado flow that flows in the opposite direction.

BACKGROUND OF THE INVENTION

In the prior art, cyclone separators are used for separation of particles of solid matter present in gas flows. In a cyclone separator, the gaseous medium flow enters inside the cyclone separator into a centrifugal flow which revolves inside the cyclone, as a rule, flowing from the top towards the bottom. When the cyclone operates in the vertical position, the inlet of the gaseous medium flow is placed at the top edge of the cyclone separator, in which case the gaseous medium flow that flows in starts revolving downwards inside the cylindrical cyclone separator. When the revolving medium flow flows down into the conical bottom portion of the cyclone separator while maintaining its flow velocity, the revolving medium flow is accelerated at a certain angular velocity. When the revolving medium flow reaches the bottom of the conical bottom portion of the cyclone separator, the revolving medium flow is forced to turn upwards while maintaining its sense of rotation. Then, as is well known, at the lowest point in the bottom end of the cyclone separator, a so-called tornado effect is produced, which is seen, for example, in summer in wind whirls.

Frequently, dust and other solid matter is absorbed into such tornado whirls, being carried along by the tornado whirl and raised even to a high altitude. It is only after disintegration of the tornado whirl that the solid matter can fall down freely and be separated from the tornado to the environment.

In principle, the same also takes place in a cyclone separator regarding the tornado formed inside the conical part at the lower end. The tornado vortex always carries along with it some of the dust or particles of solid matter entering into the cyclone along with the gaseous medium flow. This is why cyclone separators can, as a rule, not be considered to be very good dust separators, because, along with the tornado flow, even large dust particles can flow out of a cyclone separator, for which reason, by means of the prior-art cyclone separators, a particularly precise separation limit cannot be achieved.

At present, a number of different cyclone solutions are used, of which so-called low-pressure, medium-pressure, and high-pressure cyclones should be mentioned. This refers to the pressure loss in the gaseous medium flowing in the cyclone separator that is required by the flowing-through with a nominal volume. Low-pressure cyclones usually have rather large diameters. On the other hand, the diameters of high-pressure cyclones are relatively small. In high-pressure cyclones, the pressure loss may be up to 2000 Pa, whereas in low-pressure cyclones the pressure loss is usually less than 1000 Pa. High-pressure cyclones are often constructed side by side as groups, in which case such a solution is called a multi-cyclone battery. Such a multi-cyclone battery is relatively difficult to manufacture, because it comprises a number of small cyclones, whose dimensional accuracy must be very high. This is why the manufacture of multi-cyclone batteries is relatively expensive. Also, owing to the magnitude of the pressure loss, their operation requires considerably more energy than the operation of low-pressure cyclones does.

The efficiency of separation of cyclone separators depends on the centrifugal field formed inside the cyclone separator. It is commonly known that the higher the angular velocity of the gaseous medium flow, the more intensive is the centrifugal field, and that the intensity of the centrifugal field is directly proportional to the second power of the angular velocity of the medium flow. This is why small-diameter cyclone separators are more efficient separators than cyclone separators of larger diameter. It also comes from this that, in practical solutions, multi-cyclones are adopted more and more frequently even though their investment cost and power consumption are higher. In spite of this, cyclone separators are not capable of meeting the requirements of good efficiency of separation.

From the prior art, a solution is known by whose means the tornado effect can be eliminated to a reasonable extent. This solution consists of a tornado elimination plate placed at a suitable distance from the orifice of the centre pipe of the cyclone separator, which plate prevents direct flow of the tornado flow into the centre pipe. A drawback of this prior-art solution is intensive wear of the elimination plate, and further, the size of the elimination plate may produce undue wear of the cylinder part of the cyclone separator.

OBJECTS AND SUMMARY OF THE INVENTION

The object of the present invention to provide an improvement over the prior-art solutions of cyclone separators. It is a more specific object of the invention to provide a method that permits a considerable improvement of the separation efficiency of a cyclone separator.

The method in accordance with the invention is characterized in that, from the incoming medium flow, a component flow is taken, which is passed through a component-flow pipe, which pipe passes through the centre pipe of the cyclone separator, against the tornado flow that has been formed, whereby the component flow disintegrates the tornado flow and thereby prevents solid matter from being carried along with the tornado flow, through the centre pipe, into the outlet flow of the cleansed medium flow.

Owing to the solution of the present invention, it is possible to eliminate the access of the contents of dust or solid matter contained in a tornado flow into the centre pipe of a cyclone separator and from there further to the outlet flow. By means of the method in accordance with the invention, with a large-diameter cyclone separator, a degree of separation is achieved which equals or even exceeds the efficiency of separation of multi-cyclones, but, nevertheless, the gas flow flowing through the cyclone separator does not have to form a pressure loss in excess of 1000 Pa.

The invention is based on the idea that the tornado that has been formed in the conical part of the cyclone separator is disintegrated by means of a component flow that flows against the tornado, which component flow is preferably taken, or which is absorbed by itself, from the intake flow of the cyclone separator. Then, the detrimental tornado flow is recirculated among the incoming gaseous medium flow to be cleansed. The component flow is passed preferably by means of a component-flow pipe which passes through the centre pipe of the cyclone and which is substantially smaller than the diameter of the centre pipe. The absorption of the component flow into this component-flow pipe arises from the differences in pressure present in the cyclone separator, the formation of vacuum arising from the high-velocity movement of rotation of the tornado flow present in the conical bottom portion of the cyclone separator. Owing to the solution in accordance with the invention, the solid matter present in the tornado flow is recirculated to separation, and thereby the overall capacity of separation of the cyclone separator is improved considerably, being equal to the overall capacity of separation of multi-cyclones.

BRIEF DESCRIPTION OF THE DRAWING

The invention will be described in detail with reference to the solution of principle of the invention illustrated in the figure in the accompanying drawing, the invention being, however, not supposed to be confined to said solution alone.

The figure in the drawing is a schematic sectional view of a preferred embodiment of a cyclone separator that is used in the method in accordance with the invention.

DETAILED DESCRIPTION OF THE PREFERRED EMBODIMENTS

Figure 1:
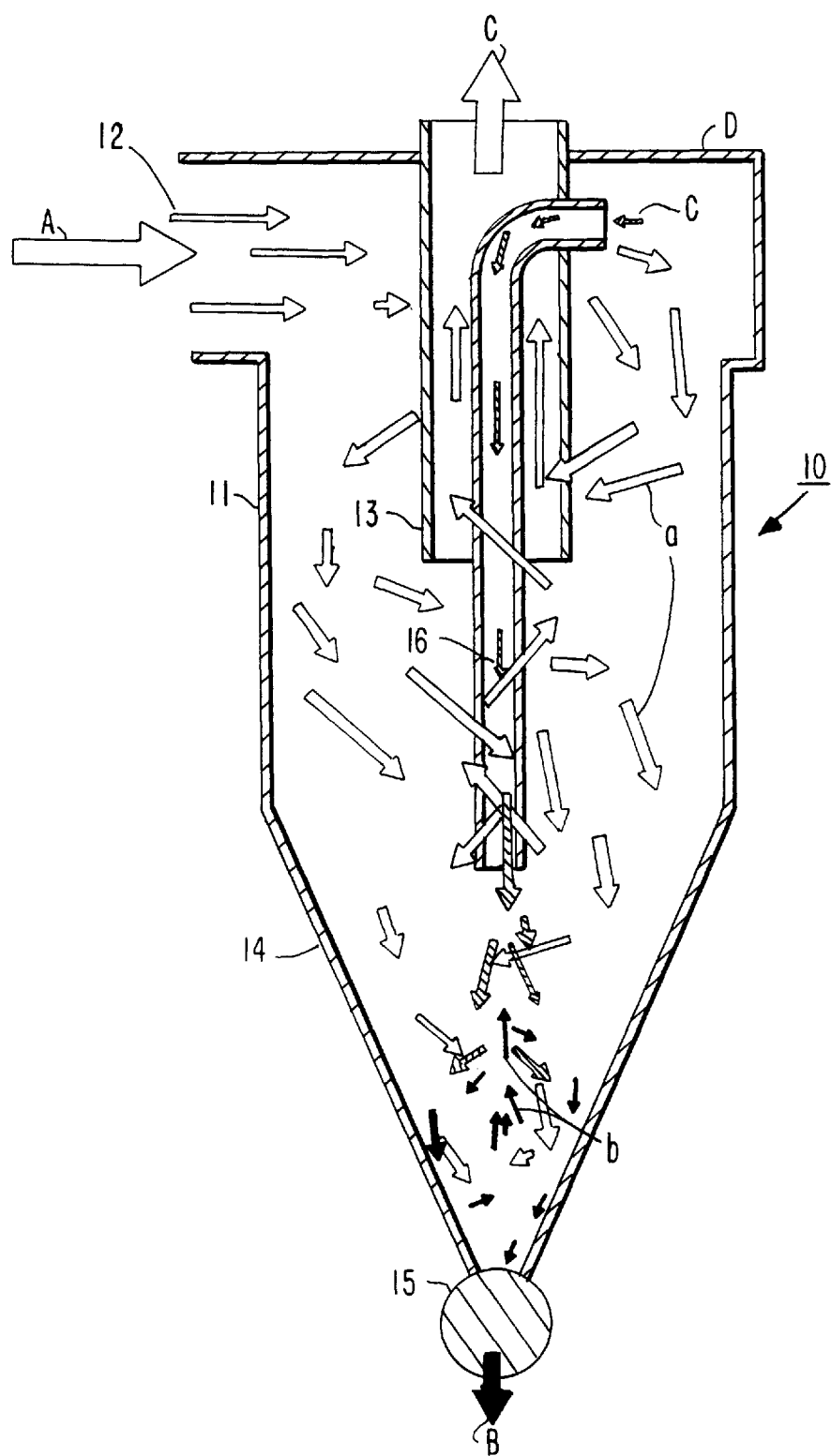

The cyclone separator that is shown in the figure in the drawing is denoted generally with the reference numeral 10. The cyclone separator 10 comprises a frame part, i.e. a cylindrical mantle part 11, an inlet flow duct 12 for the gaseous medium flow A to be cleansed, and a centre pipe 13, through which the cleansed gaseous medium flow flows out as the flow C. The frame part 11 of the cyclone separator 10 is conical at its bottom portion 14. At the bottom of the conical bottom portion 14, there is an outlet opening, which is provided with a closing device 15, through which the solid matter is removed as the flow B. Such a solution is conventional and known from the prior art, and constitutes no part of the present invention as yet.

The incoming medium flow A starts revolving inside the cylindrical mantle 11 of the cyclone separator 10 as the flow a, whose direction, as it revolves around the centre pipe 13, is downwards. When the revolving flow a reaches the conical bottom portion 14 of the cyclone separator 10, the flow a starts revolving with an ever shorter radius of rotation, while the flow a, nevertheless, still corresponds to the velocity of the incoming flow A. This is why, in the conical bottom portion 14, the angular velocity of the flow a becomes ever higher and higher. Then, the centrifugal force/field increases in proportion to the second power of the angular velocity, and this is why, in the increasing centrifugal field, the particles of solid matter are cast onto the walls of the conical lower portion 14, from where they sink into the outlet opening of the conical bottom portion 14 and through said opening into the closing part 15 in itself known, from which they can be removed as the flow B. At the lower end of the conical bottom portion 14, the flow a is converted to a flow b that is directed upwards, i.e. to a so-called tornado flow, which has the same sense of rotation as that of the flow a, but whose direction is towards the lower orifice of the centre pipe 13. The tornado flow b penetrates into the interior of the flow a of opposite principal flow direction, because of the conical shape of the conical lower portion 14. As the flow velocity continues to be substantially the same as the flow velocity of the incoming medium flow A, the angular velocity of the tornado flow b becomes multiple as compared with the angular velocity of the flow a. This results in the formation of an intensive vacuum inside the tornado flow b and in its close vicinity.

According to the invention, inside the centre pipe 13 of the cyclone separator 10, preferably on the central axis of the centre pipe, the component-flow pipe 16 is placed, whose diameter is considerably smaller than the diameter of the centre pipe 13. The open lower end of the component-flow pipe 16 is directed directly towards the tornado flow b that was formed in the conical bottom portion 14. The component-flow pipe 16 extends preferably beyond the orifice of the centre pipe 13 towards the conical bottom portion 14 in order that the vacuum effect produced by the tornado flow b should become sufficiently intensive to produce the component flow c, preferably out of the medium flow A flowing into the cyclone separator 10.

The top end of the component-flow pipe 16 preferably extends to the vicinity of the top end of the centre pipe 13, where it passes through the wall of the centre pipe 13. The component flow c entering from there into the component-flow pipe 16 can disintegrate the tornado flow b and the solid matter contained in same as the component flow c is discharged from the bottom end of the component-flow pipe 16. Thus, the solid matter contained in the tornado flow b is dispersed among the flow a, being thereby recirculated to separation.

When the component flow c is taken from the medium flow A entering into the cyclone separator 10, its magnitude in comparison to the medium flow A is negligible, as a rule, less than 10 percent by volume, preferably 0.1 ... 5 percent by volume. Thus, this component flow c takes place entirely by itself inside the cyclone separator 10. Such a component flow c requires a difference in pressure of 200 ... 500 Pa, which is already produced also in low-pressure cyclones when the cyclone receives its nominal flow A. Of course, the flow entering into the component-flow pipe 16 is already partly produced out of the difference in pressure, arising from the pressure loss of the cyclone, present at the orifice of the centre pipe 13 as compared with the pressure present at the inlet opening 12 of the cyclone. Having disintegrated the tornado flow b, the component flow c discharged out of the component-flow pipe 16 enters into the flow a revolving inside the cyclone.

By means of the method in accordance with the invention, a very high increase in the efficiency of separation is achieved, as compared with the efficiency of separation of a conventional cyclone. By means of the invention, it is possible to eliminate the tornado effect completely, which effect is present in every cyclone when it is in operation. On the other hand, the effect of the solution in accordance with the invention on the construction, cost of manufacture, and on the appearance of the cyclone separator remains fully negligible.

The location of the lower end of the component-flow pipe 16 in the conical bottom portion 14 depends, among other things, on the steepness of the conical lower portion 14 and on the velocity of the flow a, i.e. on the loading of the cyclone.

Generally speaking, the initial end of the conical lower portion 14 can be considered to be a preferable location of the lower end of the component-flow pipe 16, but the invention is by no means critical in respect of the precise location of the lower end of the component-flow pipe 16. It is the principal objective of the invention that the component flow c entering into the component-flow pipe 16 should be, as precisely as possible, equal to the amount that is required for complete disintegration of the tornado flow b formed in the cyclone separator 10. This must, of course, be found out and measured for each cyclone construction separately. Owing to the invention, the medium flow cleansed by the cyclone separator 10 can be made to escape into the centre pipe 13 as cleansed from the solid matter contained in the tornado flow b. In such a case, the cleansed medium flow C departing from the centre pipe 13 of the cyclone 10 is as clean as possible.

Above, the solution of principle of the invention has been described only, and it is obvious for a person skilled in the art that numerous modifications can be made to said solution within the scope of the inventive idea defined in the accompanying claims.

I claim:

1. In a cyclone separator intended for separating and cleansing a gaseous medium flow and including a substantially cylindrical upper part having an inlet duct through which the gaseous medium flow to be cleansed flows as a incoming medium flow into an interior of the cyclone separator, a conical lower part, and a center pipe through which cleansed gaseous medium is removed as an outlet flow from the interior of the cyclone separator, the improvement comprising:

a component-flow pipe having an inlet opening arranged in a wall of the center pipe and an outlet end arranged opposite the lower portion of the conical lower part such that the component-flow pipe extends through an interior of the center pipe, a component flow portion of the incoming medium flow being passed from a location exterior of the center pipe and within the interior of the cyclone separator through the wall of the center pipe into the component-flow pipe and from the component-flow pipe against a tornado flow formed in the lower portion of the conical lower part such that the component flow disintegrates the tornado flow and prevents solid matter from being carried through the center pipe with the outlet flow of the cleansed gaseous medium.

2. In a method for improving the separation and cleansing efficiency of a cyclone separator intended for a gaseous medium flow in which the gaseous medium flow to be cleansed flows as a incoming medium flow into an interior of the cyclone separator through an inlet duct and flows in a revolving flow movement inside a substantially cylindrical upper part of the cyclone separator and an upper portion of a conical lower part of the cyclone separator, the revolving flow movement of the gaseous medium flow being changed in a lower portion of the conical lower part of the cyclone separator into a revolving tornado flow movement in an opposite direction to the direction of the revolving flow movement in the upper portion of the conical lower part of the cyclone separator, solid matter being separated from the gaseous medium in the cyclone separator whereby the gaseous medium from which solid matter is separated is directed from the cyclone separator through a center pipe, the improvement comprising the steps of:

arranging a component-flow pipe to extend at least from an opening in a wall of the center pipe to a location within the center pipe, passing a component flow portion of the incoming medium flow from a location exterior of the center pipe and within the interior of the cyclone separator into the component-flow pipe, and directing the component flow from the component-flow pipe against the tornado flow such that the component flow disintegrates the tornado flow and prevents solid matter from being carried through the center pipe into an outlet flow of the cleansed gaseous medium.

3. The method of claim 2, further comprising the step of controlling the amount of the component flow being separated from the incoming medium flow such that the amount of the separated component flow is less than about 10 percent by volume of the incoming medium flow.

4. The method of claim 2, further comprising the step of controlling the amount of the component flow being separated from the incoming medium flow such that the amount of the separated component flow is from about 0.1 to about 5 percent by volume of the incoming medium flow.

5. The method of claim 2, further comprising the step of positioning the location of a lower end of the component-flow pipe relative to the lower portion of the conical lower part such that the tornado flow has sufficient space to develop.

6. The method of claim 2, wherein the component-flow pipe has a diameter which is smaller than the diameter of the center pipe.

7. The method of claim 2, wherein the step of passing the component flow into the component-flow pipe comprises the step of forming a vacuum as a result of the tornado flow in the lower portion of the conical lower part of the cyclone separator such that a difference is pressure is created between an outlet end of the component-flow pipe proximate to the lower portion of the conical lower part of the cyclone separator and an inlet end of the component-flow pipe through which the component flow is passed from the incoming medium flow.

8. The method of claim 2, further comprising the step of positioning the component-flow pipe such that a central axis of a cylindrical portion of the component-flow pipe is coincident with a central axis of the center pipe.

9. The method of claim 2, wherein the component-flow pipe is arranged to extend from a location exterior of the center pipe and within the interior of the cyclone separator through a side wall of the center pipe to the interior of the center pipe.

10. The method of claim 2, wherein the component flow is separated from the incoming medium flow at a location within the substantially cylindrical upper part of the cyclone separator.

11. A method for separating and cleansing a gaseous medium in a cyclone separator, comprising the steps of:

directing the gaseous medium to be cleansed as a incoming medium flow into an interior of the cyclone separator through an inlet duct to cause the incoming medium flow to flow in a revolving flow movement inside a substantially cylindrical upper part of the cyclone separator and an upper portion of a conical lower part of the cyclone separator, the revolving flow movement of the incoming medium flow being changed in a lower portion of the conical lower part of the cyclone separator into a revolving tornado flow movement in an opposite direction to the direction of the revolving flow movement in the upper portion of the conical lower part of the cyclone separator, directing cleansed gaseous medium from which solid matter has been separated in the cyclone separator from the cyclone separator through a center pipe extending through the cylindrical upper part of the cyclone separator, arranging a component-flow pipe to extend at least from an opening in a wall of the center pipe to a location within the center pipe, and passing a component flow portion of the incoming medium flow from a location exterior of the center pipe and within the interior of the cyclone separator into the component-flow pipe, and directing the component flow from the component-flow pipe against the tornado flow such that the component flow disintegrates the tornado flow and prevents solid matter from being carried through the center pipe into an outlet flow of the cleansed gaseous medium.

12. The method of claim 11, wherein the component-flow pipe is arranged to extend from a location exterior of the center pipe and within the interior of the cyclone separator through a side wall of the center pipe to the interior of the center pipe and the component flow is separated from the incoming medium flow at a location within the substantially cylindrical upper part of the cyclone separator.

13. A method for improving the separation efficiency of a cyclone separator intended for gaseous medium flows, comprising the steps of:

directing an incoming gaseous medium flow to be cleansed into the cyclone separator through an inlet duct such that the incoming medium flow ends up in a downward, revolving flow movement inside the cyclone separator until the incoming medium flow reaches a bottom end of a conical lower part of the cyclone separator and then becomes a revolving tornado flow that flows in a generally upward direction opposite to the direction of the downward, revolving flow movement, directing an outlet flow of cleansed gaseous medium through a center pipe situated in the cyclone separator, arranging a component-flow pipe in the center pipe such that the component-flow pipe has an inlet opening in a wall of the center pipe, passing a component flow of the incoming medium flow from a location within the cyclone separator through the inlet opening in the wall of the center pipe into the component-flow pipe, and directing the component flow out of the component-flow pipe against the tornado flow that has been formed such that the component flow disintegrates the tornado flow and thereby prevents solid matter from being carried along with the tornado flow through the center pipe into the outlet flow of the cleansed medium flow.

14. A method as claimed in claim 13, further comprising the step of utilizing as the component flow, a flow that is less than 10 per cent by volume of the incoming medium flow.

15. A method as claimed in claim 13, further comprising the step of utilizing as the component flow, a flow is used that is from 0.1 to 5 percent by volume of the incoming medium flow.

16. A method as claimed in claim 13, further comprising the step of positioning the location of the lower end of the component-flow pipe such that the tornado flow has time to be formed completely.

17. A method as claimed in claim 13, further comprising the step of utilizing as the component-flow pipe, a pipe whose diameter is smaller than the diameter of the center pipe.

* * * * *